(12) United States Patent
Nagata (10) Patent No.: US 7,502,144 B2
(45) Date of Patent: Mar. 10, 2009

(54) METHOD OF PREPARING BIT MAP

(75) Inventor: Katsuaki Nagata, Shizuoka (JP);
Yoshiko Nagata, legal representative, Shizuoka (JP)

(73) Assignee: Naltec, Inc., Shizuoka (JP)

( * ) Notice: Subject to any disclaimer, the term of this patent is extended or adjusted under 35 U.S.C. 154(b) by 562 days.

(21) Appl. No.: 10/490,048

(22) PCT Filed: Sep. 20, 2002

(86) PCT No.: PCT/JP02/09667

§ 371 (c)(1),
(2), (4) Date: Mar. 19, 2004

(87) PCT Pub. No.: WO03/032256

PCT Pub. Date: Apr. 17, 2003

(65) Prior Publication Data

US 2004/0239958 A1 Dec. 2, 2004

(30) Foreign Application Priority Data

Sep. 20, 2001 (JP) .............................. 2001-286503

(51) Int. Cl.
*G06T 5/00* (2006.01)

(52) U.S. Cl. .................. 358/3.27; 358/1.2; 358/447; 382/299; 382/300; 382/269; 382/254; 382/268

(58) Field of Classification Search ............... 358/447, 358/1.2, 3.27; 382/300, 299, 269, 254, 266, 382/268; 345/611

See application file for complete search history.

(56) References Cited

U.S. PATENT DOCUMENTS

| 5,337,159 A | 8/1994 | Iida et al. |
| 6,038,039 A * | 3/2000 | Zeng ..................... 358/447 |

FOREIGN PATENT DOCUMENTS

| JP | 57-207983 | 12/1982 |
| JP | 63/220670 | 9/1988 |
| JP | 02-059365 | 2/1990 |
| JP | 04-172871 | 6/1992 |
| JP | 04-329483 | 11/1992 |
| JP | 05-188913 | 7/1993 |
| JP | 08-227456 | 9/1996 |
| JP | 2000-278522 | 10/2000 |

* cited by examiner

*Primary Examiner*—King Y Poon
*Assistant Examiner*—Jamares Washington
(74) *Attorney, Agent, or Firm*—Blank Rome LLP (57) ABSTRACT

A method of generating a second bit map, improved in first-direction resolution, from a first bit map having a plurality of image-forming pixels arranged two-dimensionally, the method comprising a first detection step of detecting first and second edges appearing in a second direction orthogonal to a first direction in a first bit map, and the first addition step of adding at least an edge extending in the first direction, when a portion between the first and second edges permits interpolation, to between third and fourth edges on the second bit map respectively corresponding to the first and second edges so as to effect interpolation between the third and fourth edges. Since the first and second edges, if detected, permit smoothing, a look-up table is not needed, and even a long-range unevenness can be smoothed without a smoothing range being limited to a predetermined region.

14 Claims, 6 Drawing Sheets

METHOD OF PREPARING BIT MAP

TECHNICAL FIELD

The present invention relates to a method and apparatus for converting a resolution of an original image to a higher resolution when displaying or printing the image.

BACKGROUND ART

When an image is printed by a printer or the like, a bit map that is a two-dimensional arrangement of pixels forming an original image is converted into a bit map with a higher resolution before printing is carried out. When doing so, some devices improve the printed image quality by smoothing corner parts of pixel patterns in the bit map.

Methods of smoothing such corner parts are disclosed by Japanese Laid-Open Patent Publication Nos. H7-283946 and H7-288693, for example. In such conventional methods, pixel patterns of corner parts are detected from the bit map and such pixel patterns are replaced with smoothed pixel patterns given in a look-up table that is prepared in advance. A method that performs smoothing by inserting average values for two lines of pixels in the original image between those two lines is also known.

The smoothing method that inserts pixels with averaged values between two lines of pixels in the original is realized by simple processing and there is no need to prepare a look-up table, so that the method can be used easily. However, in this method, pixels that are arranged for smoothing corner parts are concentrated in the corner parts, so that on the contrary stepped parts actually become more prominent. As a result, in the original image, parts formed of a plurality of consecutive steps so as to represent an oblique outline become wavy, so that there is the problem of linear outlines being lost when the resolution is raised.

A smoothing method that uses a look-up table can produce smoother outlines than the method described above by preparing pixel patterns in advance so that the pixels disposed for smoothing purposes are not concentrated in corner parts. For example, in the Japanese Laid-Open Patent Publication Nos. H7-283946 and H7-288693 mentioned above, smoothing is performed not only by adding pixels to fill in corner parts but also by cutting out parts with consideration to the white/black balance. However, processing time is required to search the look-up table. Additionally, it is not easy to produce a look-up table in advance. There is also a limit on the pixel patterns that can be prepared as a look-up table, which limits the range of corner parts that can be amended. Accordingly, although it is possible to amend short-cycle unevenness extremely well, long-cycle unevenness cannot be amended. This means that when an original image includes a part formed of a plurality of consecutive steps so as to represent an oblique outline as described above, raising the resolution results in a wavy state, again causing the problem of a loss of linear outlines.

It is an object of the present invention to provide a method and apparatus that can perform smoothing without using a look-up table and can also perform smoothing favorably even when there is long-cycle unevenness. It is a further object of the present invention to provide a method and apparatus that can perform smoothing where linear outlines are not lost when raising the resolution of parts formed of a plurality of consecutive steps for representing an oblique outline in an original image.

DISCLOSURE OF THE INVENTION

The present invention, instead of performing smoothing by cutting away corners or steps or by filling corners or steps with dots, focuses on corners that are adjacent or appear in one after another, that is, edges that appear in a given direction in original bit map data (referred to as a "bit map" in this description), and when improving resolution, performs smoothing by disposing a new edge so as to effect interpolation between such edges. That is, the present invention is a method of generating a bit map, including: a first detection step of detecting, when a second bit map, improved in first-direction resolution, is prepared from a first bit map in which a plurality of image-forming pixels are arranged two-dimensionally, a first edge and a second edge appearing in a second direction orthogonal to a first direction in the first bit map; and a first addition step of adding at least an edge extending in the first direction, when a portion between the first and second edges permits interpolation, between a third edge and a fourth edge in the second bit map that respectively correspond to the first edge and the second edge, so as to effect interpolation between the third edge and the fourth edge.

In the method of generating a bit map according to the present invention, smoothing can be performed if a first edge and a second edge are detected, so that a look-up table is not needed. Accordingly, the range of target for smoothing is not limited to a predetermined region, and even long-cycle or long-range unevenness can be smoothed. In addition, by adding at least an edge between the third and fourth edges so as to effect interpolation between the third and fourth edges, it is possible to prevent the pixels being concentrated at either of the third and/or fourth edges. Accordingly, when the resolution is raised for a part formed of a plurality of consecutive steps to represent an oblique outline, it is possible to perform smoothing without losing the linearity of the outline.

Also, the method of generating a bit map according to the present invention does not require a process that prepares a look-up table in advance. In the present method of generating a bit map, since a look-up table is not needed, it is possible to expand images by rates of magnification and/or to increase resolution in ranges that cannot be covered by a look-up table. Accordingly, the method of generating a bit map according to the present invention can expand images using flexible rates of magnification and can output a smoothed image that has been magnified and/or whose resolution has been improved.

The present method of generating a bit map can be executed by a program (program product) that can have an information processing device, such as a computer or a microprocessor, a terminal, or a control apparatus execute the detection step and addition step described above. Namely, the program or program product includes instructions for the same. The program or program product can be provided with an appropriate recording medium such as a ROM, or via a computer network. It is also possible to prepare a second bitmap, improved in first-direction resolution, from a first bit map according to the method of generating a bit map using a bit map generating apparatus of the present invention realized by dedicated circuits or hardware logic, or realized by installing the program or program product into a general-purpose microprocessor or computer. The bit map generating apparatus has function as a first detecting means for detecting a first edge and a second edge appearing in a second direction orthogonal to a first direction, in which resolution is raised, from the first bit map and a first addition means of adding, between a third edge and a fourth edge in the second bit map that respectively correspond to the first edge and the second edge, at least an edge extending in the first direction so as to effect interpolation between the third edge and the fourth edge.

The second bit map of the present invention is prepared from a first bit map in which a plurality of image-forming pixels are arranged two-dimensionally so as to have improved resolution in a first direction, the second bit map having at least a first additional edge that extends in the first direction between a third edge and a fourth edge respectively corresponding to a first edge and a second edge appearing in the first bit map in a second direction orthogonal to the first direction, the first additional edge effecting interpolation between the third edge and the fourth edge. This bit map can be provided by recording onto an appropriate recording medium such as a disk, can be provided via a computer network, or can be provided having been printed by a printer onto a print sheet that is a recording medium.

It is preferable for smoothing to be performed for edges where there is an increase or decrease of only one pixel in the first bit map due to quantization, and also preferable to leave the form of edges where there is an increase or decrease of two or more pixels in the original image without smoothing. In the first detection step, by scanning three pixels, which are adjacent in the first direction, in the second direction orthogonal to the first direction, it is possible to detect a first edge and a second edge that are aligned some distance apart after the resolution has been improved.

In the first detection step, when a center of the three adjacent pixels in the first direction has been set as an edge detection line in the first detection step, in a case where a pixel in the edge detection line changes from "off" to "on", a position after a change in a combination of the three pixels from "off-off-off" (in a color or monochrome image, dots of a color (RGB or YMC) or black (K) to be subjected to smoothing are "on" and dots of other colors or white (W) are "off", so that for a monochrome image, "off-off-off" is "W-W-W", with the following description also referring to monochrome images) to "off-off-on" (W-W-K) or "on-off-off" (K-W-W) can be set as the first edge, and a subsequent position after a change to "off-on-on" (W-K-K) or "on-on-off" (K-K-W) respectively can be set as the second edge. In the same way, in a case where a pixel in the edge detection line changes from "on" to "off", a position prior to a change in the combination of the three pixels from "on-on-off" (K-K-W) to "on-off-off" (K-W-W) or from "off-on-on" (W-K-K) to "off-off-on" (W-W-K) can be set as the first edge, and a subsequent position prior to a change to "off-off-off" (W-W-W) can be set as the second edge. Additionally, when a pattern that is neither a pattern after a change corresponding to the first edge nor a pattern corresponding to the second edge is not detected between the first edge and the second edge, the first edge and the second edge are treated as valid, and interpolation is effected between the first and second edges.

In addition, in the present method of generating, smoothing is performed by adding pixels. Accordingly, to prevent the white/black balance from becoming prominently uneven, in the first addition step it is preferable to add the edge within a range in which the edge and a straight line connecting the third edge and the fourth edge are not crossed.

When the resolution of the second bit map is also improved in the second direction orthogonal to the first direction, it is possible to perform smoothing in the same way as described above in the second direction also. That is, it is possible to further implement a second detection step of detecting a fifth edge and a sixth edge appearing in one after another in the first direction in the first bit map and a second addition step that adds, between a seventh edge and an eighth edge in the second bit map that respectively correspond to the fifth edge and the sixth edge, at least an edge that extends in the second direction so as to effect interpolation between the seventh edge and the eighth edge.

When scanning in the first direction, it is possible to detect a fifth edge and a sixth edge in the same way. That is, when a center of the three adjacent pixels in the second direction is set as an edge detection line in the second detection step, in a case where a pixel in the edge detection line changes from "off" to "on", a position after a change in a combination of the three pixels from "off-off-off" (W-W-W) to "off-off-on" (W-W-K) or "on-off-off" (K-W-W) is set as the fifth edge, and a subsequent position after a change to "off-on-on" (W-K-K) or "on-on-off" (K-K-W) respectively is set as the sixth edge, in a case where a pixel in the edge detection line changes from "on" to "off", a position prior to a change in the combination of the three pixels from "on-on-off" (K-K-W) to "on-off-off" (K-W-W) or from "off-on-on" (W-K-K) to "off-off-on" (W-W-K) is set as the fifth edge, and a subsequent position prior to a change to "off-off-off" (W-W-W) is set as the sixth edge, and when a pattern that is neither a pattern after a change corresponding to the fifth edge nor a pattern corresponding to the sixth edge is not detected between the fifth edge and the sixth edge, the fifth edge and the sixth edge are treated as valid. In addition, in the second addition step, the edge is added within a range in which the edge and a straight line joining the seventh edge and the eighth edge are not crossed.

As described above, the method of generating a bit map according to the present invention can be provided as a program and can also be provided as a dedicated chip (ASIC or LSI). Accordingly, it is possible to provide an image output apparatus including a bit map generating apparatus according to the present invention and an output mechanism that outputs the second bit map generated by the bit map generating apparatus as an image. A printing mechanism that prints an image according to the second bit map is one such output mechanism, and according to the present invention it is possible to provide a printer that prints out an image at high resolution according to the second bit map with smoothly connected outlines that are not wavy.

BEST MODE FOR CARRYING OUT THE INVENTION

Figure 1:
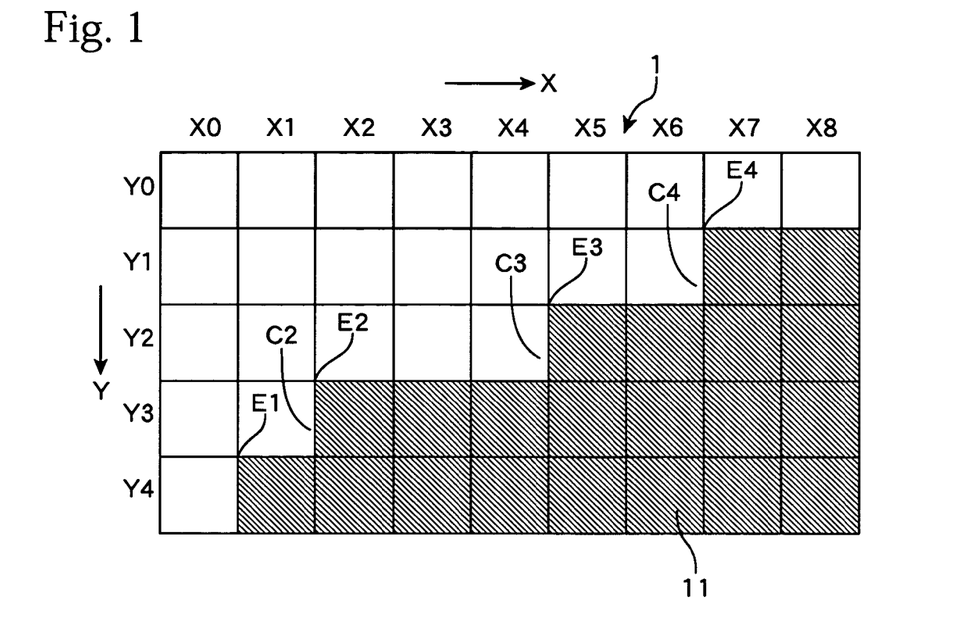
FIG. 1 shows an example of an original bit map.

The present invention will now be described in more detail with reference to the attached drawings. FIG. 1 shows an example of original bit map data (a first bit map). This bit map data (hereinafter simply "bit map") 1 is a bit map with five rows and nine columns (i.e., a 5×9 bit map), in which an image 11 with four edges numbered E1, E2, E3, and E4 starting from the left-side of FIG. 1 is composed of black dots.

Figure 2:
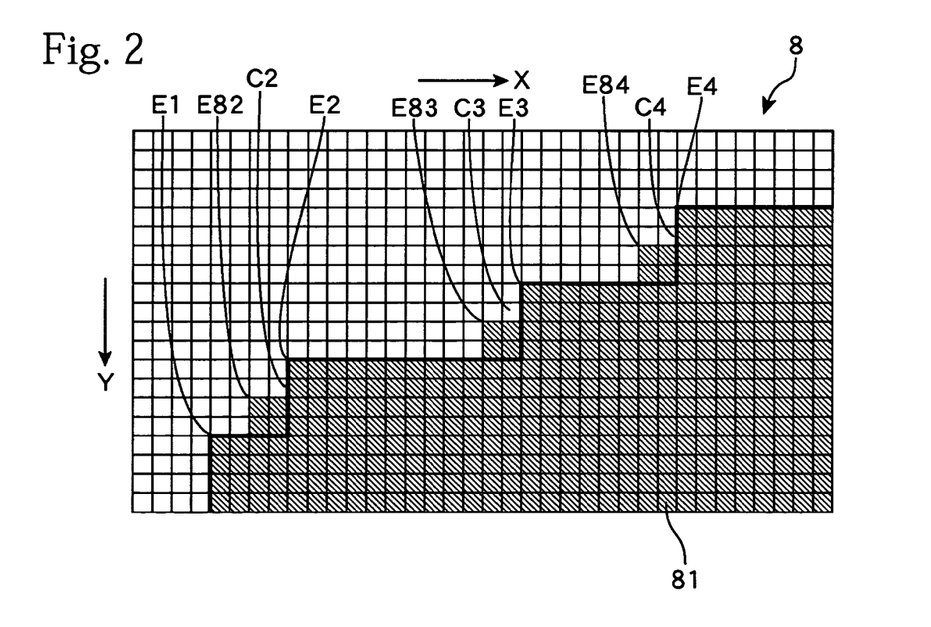
FIG. 2 shows an example where the original bit map has been converted to high resolution and smoothing has been performed by inserting average values of two lines of original pixels.

A bit map 8 shown in FIG. 2 is an example where resolution of the original bit map 1 has been increased by a factor of 4 in a row direction X and by a factor of 4 in a column direction Y. Smoothing has been performed so as to insert average values of two lines of pixels in the original at respective corners formed by the edge parts E2 to E4 out of the edges E1 to E4. Since it is unclear whether the edge E1 forms a corner, smoothing is not performed at the edge E1. An edge E84 that is half as high as the edge E4 is formed to fill a corner C4 on a left side of the edge E4, an edge E83 that is half as high as the edge E3 is formed to fill a corner C3 on a left side of the edge E3, and an edge E82 that is half as high as the edge E2 is formed to fill a corner C2 on a left side of the edge E2.

These edges E82 to E84 fill the corners C2 to C4, so that peripheries of the edges E2 to E4 are smoothed and the edges E2 to E4 are de-emphasized compared to the image 11 of the original bit map 1. However, since pixels or dots are added only at peripheries of the edges E2 to E4, the edges E2 to E4 remain prominent, and the bit map remains an image in which the edges E2 to E4 are emphasized. Or, the viewer is given the impression that only the peripheries of the edges E2 to E4 are oblique, so that when the bit map 8 is used, an image 81 is printed with a wavy-looking outline whose curvature fluctuates.

Figure 3:
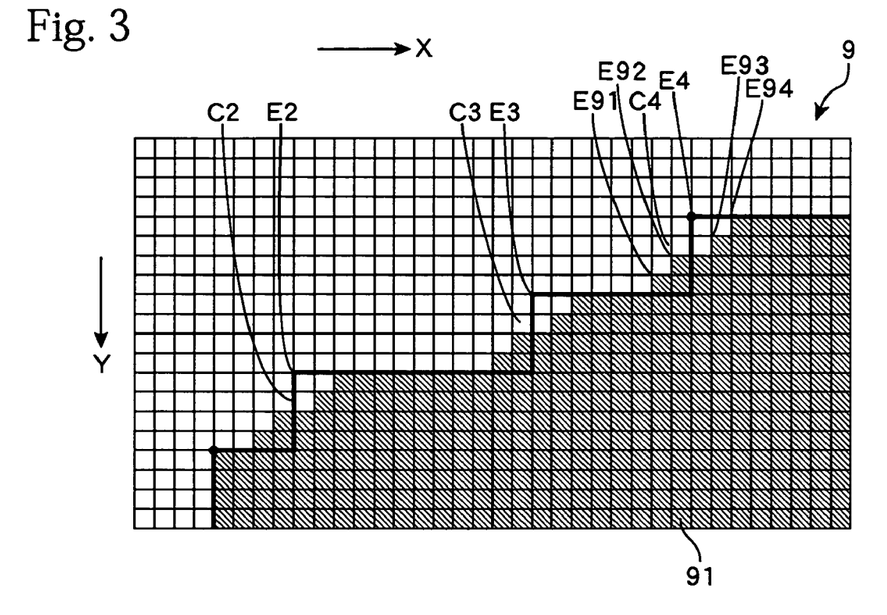
FIG. 3 shows an example where the original bit map has been converted to high resolution and smoothing has been performed by adding dots to corners and cutting edges using a look-up table.

A bit map 9 shown in FIG. 3 is also an example where the resolution of the original bit map 1 has been increased by a factor of 4 in the row direction X and by a factor of 4 in the column direction Y. This bit map 9 is obtained by smoothing performed not just by adding dots to fill the corners using a look-up table but also by cutting the edges in consideration of a white/black balance. Accordingly, three dots that form the edge E4 are deleted, the corner C4 is filled using three dots, and a part of the original image 11 from the corner C4 to the edge E4 is smoothed to an approximately straight oblique image by four fine edges E91, E92, E93, and E94 that are disposed at approximately equal intervals. A part around the corner C3 and the edge E3, and a part around the corner C2 and the edge E2 are smoothed in the same way.

Emphasized edges cannot be seen in the outline of an image 91 represented by the bit map 9. However, the curvature of the line forming this outline slightly fluctuates in the same way as in the image 81 represented by the bit map 8 described above, and therefore gives the impression of a wavy line. Accordingly, although the image 91 represented by this bit map 9 has a smoother outline than the image 81 since emphasized edges cannot be seen, the outline is still wavy, and a smooth outline with no large variation in curvature, like the straight line in the original image 11, does not appear.

Figure 4:
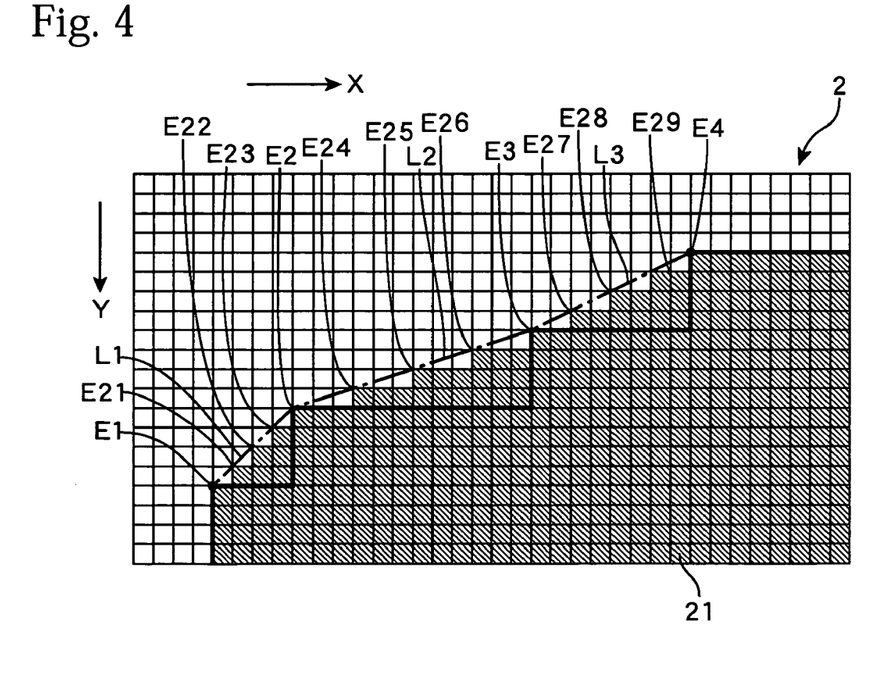
FIG. 4 shows an example where the original bit map has been converted to high resolution and smoothing has been performed according to the method of generating according to the present invention.

A bit map 2 shown in FIG. 4 is an example where the resolution of the original bit map 1 has been increased by a factor of 4 in the row direction X and by a factor of 4 in the column direction Y using the method of generating according to the present invention. In this bit map 2, instead of just the corner parts being filled by adding dots, edges are added so as to effect a linear interpolation between adjacent edges in the original image. In the bit map 2, portions between edges in the original are subjected to a linear smoothing, so that an image 21 with linear outlines whose curvature hardly fluctuates is drawn.

Between the edges E3 and E4, edges E27, E28, and E29 that extend in the Y direction are formed so that these edges E27 to E29 do not close over a straight line L3 interpolated between the edges E3 and E4 and a linear outline is drawn by these edges E3, E27, E28, E29, and E4. In the same way, between the edges E2 and E3, edges E24, E25, and E26 that extend in the Y direction are formed so that the edges E24 to E26 do not close over a straight line L2 interpolated between the edges E2 and E3 and a linear outline is drawn by these edges E2, E24, E25, E26, and E3. Also, between the edges E1 and E2, edges E21, E22, and E23 are formed so that the edges E21 to E23 do not close over a straight line L1 interpolated between the edges E1 and E2 and a linear outline is drawn by these edges E1, E21, E22, E23, and E2.

Figure 5:
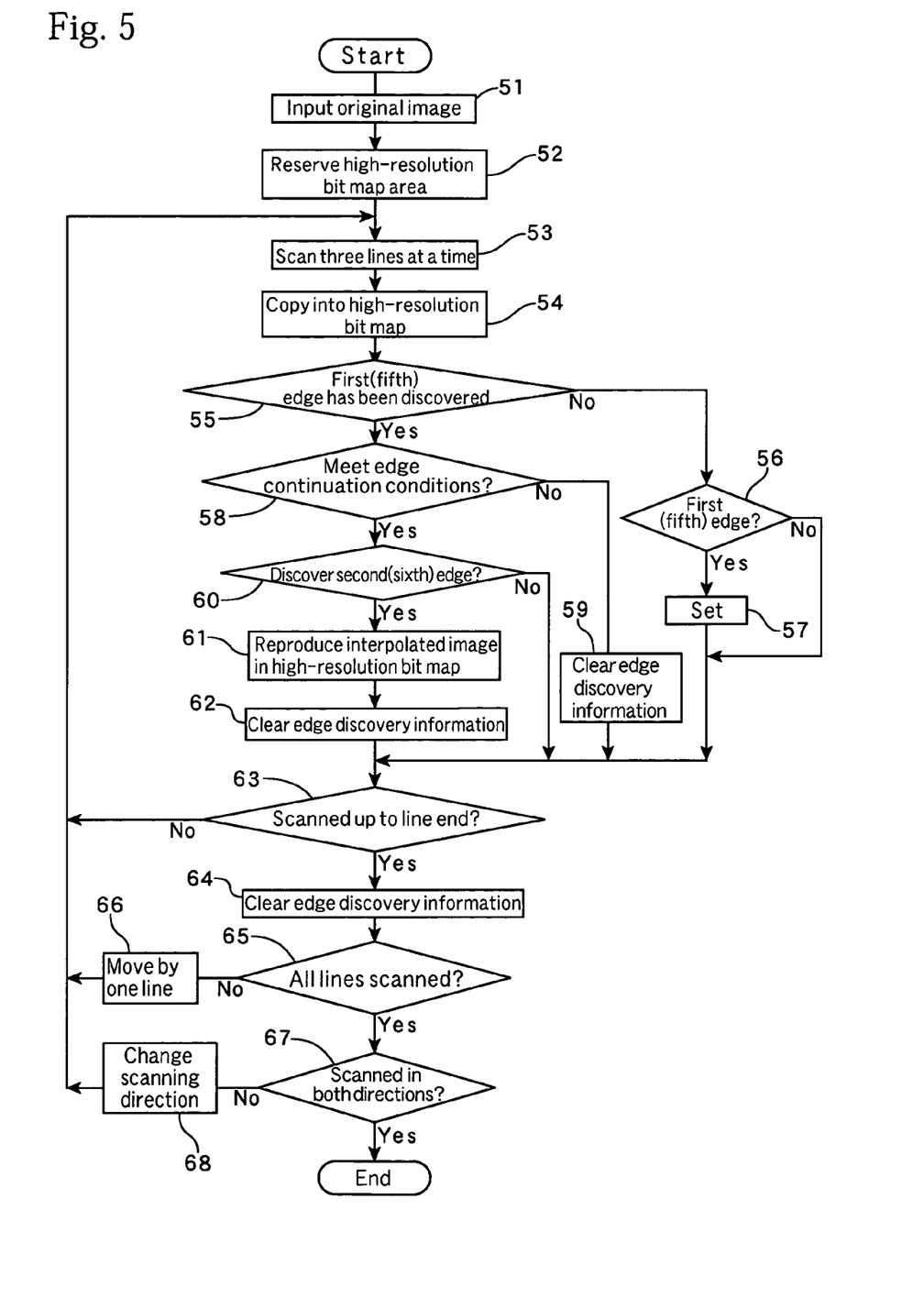
FIG. 5 is a flowchart showing the overall method of generating a bit map according to the present invention.

FIG. 5 is a flowchart showing the processing that prepares a high-resolution bit map according to the present invention. First, after the original bit map 1 has been inputted in step 51, in step 52 a region for generating the high-resolution bit map 2 is reserved. This region or area for the high-resolution bit map may be provided in advance in a memory, or may be a region in a memory that is dynamically acquired by this process. In order to form the high-resolution bit map 2, it is possible to obtain every region for storing bit maps in a single operation and it is also possible to successively acquire regions for storing corresponding parts of the high-resolution bit map 2 whenever the original bit map 1 is scanned as described later. In addition, although in the present embodiment, the high-resolution bit map 2 is increased by an integer factor (4×4) with respect to the original bit map 1, it is possible to use any magnification factors in the X direction and the Y direction (the "row direction" and "column direction", or "main scanning direction" and "sub scanning direction"). It is possible to not raise the resolution in one of the axes, i.e., to use a magnification factor of one.

Next step 53 corresponds to a "first detection step" or "first detection process", wherein edges are detected by scanning data of three adjacent pixels in the Y direction of the original bit map 1 in the X direction. That is, in the bit map 1, data of three adjacent lines in the Y direction is scanned in the X direction to detect edges in the original bit map 1. For example, in FIG. 1, the lines Y0, Y1, and Y2 are scanned in the X direction from X0 to X8.

Figure 6:
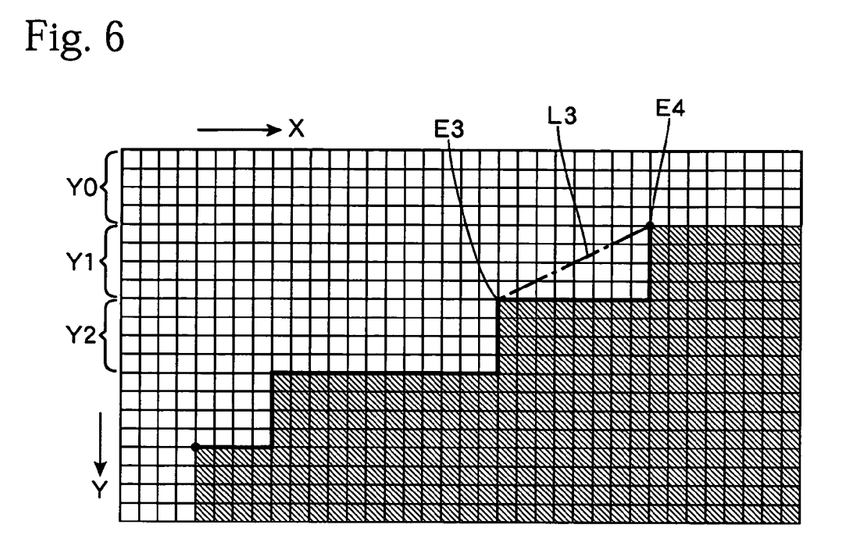
FIG. 6 is a diagram showing the process in which smoothing is performed according to the method shown in FIG. 5.

With scanning, first in step 54, black dot parts of the original bit map 1 are copied into the high-resolution bit map 2. By doing so, as shown in FIG. 6, an identical image to the image 11 of the original bit map 1 is reproduced in the high-resolution bit map 2 that is a 4×4 enlargement. At the same time, in step 55, it is determined whether a first edge has already been discovered.

When a first edge has not been discovered, it is determined in step 56 whether there is a first edge. Recognition of an edge is performed by comparing a three-dots-pattern, which were previously obtained by an immediately preceding during scan in the X direction of three lines, for example, the lines Y0, Y1, and Y2, with a new three-dots-pattern obtained. For a situation where a pixel changes from white (W) to black (K), as shown in FIGS. 7(a) and 7(b), there are cases where the previous dot pattern X71 or X75 was "W-W-W" (off-off-off) and the present dot pattern X72 or X76 is "W-W-K" (off-off-on) or "K-W-W" (on-off-off), and in such cases the dot of Y73 or Y75 in a position corresponding to X72 or X76 is recognized as a first edge. Once the first edge has been discovered, a flag, a register, or the like is set in step 57.

Figure 7:
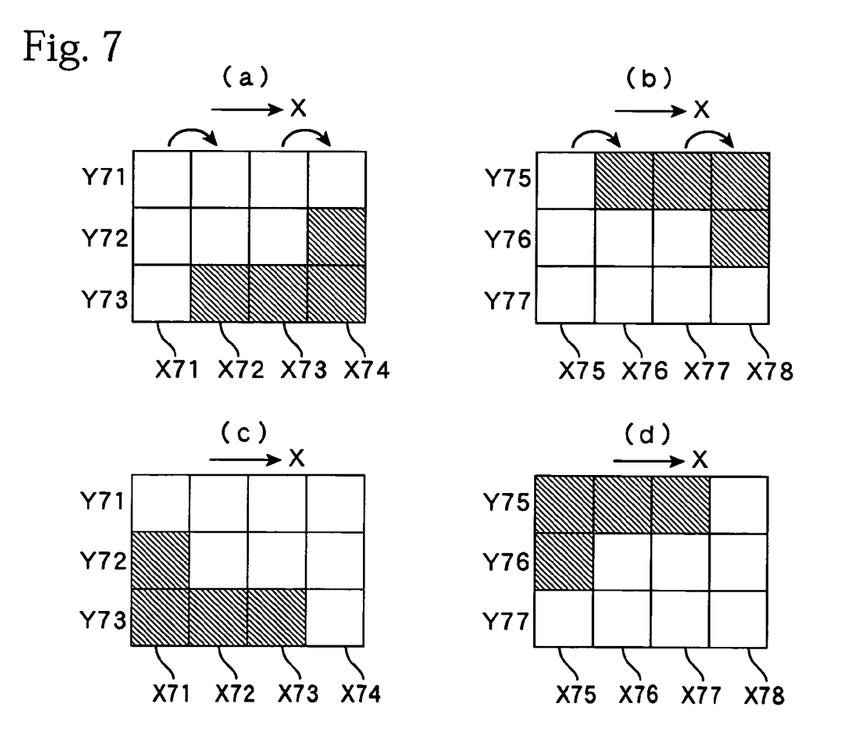
FIG. 7 is a series of diagrams useful in explaining an example of edge detection.

When the first edge has been discovered, it is determined in step 58 whether a search for a second edge can continue. In cases where the same dot pattern is obtained as the pattern for which the first edge was detected, such as with the dot pattern X73 or X77 in FIG. 7(*a*) or 7(*b*), the search continues. In the case of the dot pattern X74 or X78 also, the search continues. As described later, such dot pattern X74 or X78 becomes the second edge. In this way, when the obtained dot pattern is the same as the first edge, or when the number of black dots increases by one, the search continues, while in the case when there is a decrease in the number of black dots or the number of black dots increases by two, in step 59 the "discovered" state for the first edge is reset.

When an edge is detected while scanning three lines at a time in the X direction (the processing is the same in the Y direction), there are changes from a white dot to a black dot and changes from a black dot to a white dot. As described above based on FIGS. 7(*a*) and 7(*b*), in the case of a change from a white dot to a black dot, if the middle line of the three lines is set as an "edge detection line", when the dot on that line is white (W), a part that becomes a black dot (K) at a position where there is a change in the dot pattern from "W-W-W" to a pattern "W-W-K" or "K-W-W" is treated as the first edge. In subsequent scans, the second edge is detected at a black dot in the edge detection line at a position where the dots in the edge detection line and the line of the first edge are both black and a dot in the remaining line is white, that is, a dot pattern "W-K-K" with respect to the dot pattern "W-W-K" or the dot pattern "K-K-W" with respect to the dot pattern "K-W-W". However, in a case where in a scan subsequent to the detection of the first edge, a dot pattern appears that is not the same pattern as the pattern when the first edge was discovered or the pattern corresponding to a second edge, interpolation cannot be performed for the discovered edges, so that the previously discovered first edge is ignored and a detection of a new first edge is commenced once again.

For example, when the number of black dots has decreased, this means that there is an edge that faces an opposite direction to the first edge, making it impossible to perform interpolation between the two edges. When the dot pattern changes to "K-K-K", there is a step with a distance of two or more dots and the height of the stepped part cannot be detected by a comparison of three lines. There is little probability of a step with a distance of two or more dots having been created by quantization of a curve or a straight line into dots, so that if such a part is smoothed, on the contrary this can lead to image deterioration due to a fall in image sharpness. Accordingly, in the present embodiment, only single dot edges are detected and smoothed. This means that by scanning three lines, it is possible to detect every pair of edges required to perform smoothing.

On the other hand, as shown in FIGS. 7(*c*) and 7(*d*), in the case of a change from a black dot (K) to a white dot (W), when the dot on the edge detection line of the dot pattern is black, the black dot on the edge detection line at a position where the dot pattern changes from "K-K-W" to "K-W-W" (see FIG. 7(*d*)), or from "W-K-K" to "W-W-K" is treated as the first edge. In a subsequent scan, a black dot before the change at a position where the dot pattern is detected as having changed from "K-W-W" or "W-W-K" to "W-W-W" is the second edge. In a case where in a scan subsequent to the detection of the first edge, a dot pattern has been detected that is not the same as the dot pattern "K-W-W" or "W-W-K" following the first edge and is neither the pattern "W-W-W" for the second edge, interpolation cannot be performed for the discovered edges, so that the discovered first edge is ignored and the detection of a new first edge is commenced once again.

The relationship between the first edge and the second edge that are detected in this way, which is to say the distance between the first edge and the second edge, is valid across an entire line on which detection is being performed, which is to say from a start to an end in the X direction or the Y direction, and so is unlimited. It is therefore possible to detect unevenness that is extremely far apart and smoothing can be performed accordingly.

In step 60, when first and second edges that are one after another or aligned in the X direction and for which interpolation can be performed have been detected, in step 61 a first addition step or addition process that reproduces interpolated images of third and fourth edges, which are corresponding to the first and second edges, on the high-resolution bit map 2 is performed. That is, in FIG. 4, edges E21 to E29 that extend in the Y direction are added so as to effect interpolation between the edges corresponding to the first edges E1, E2, and E3 and the second edges E2, E3, and E4 respectively that are discovered by scanning the first bit map 1 shown in FIG. 1 (corresponding edges have been given the same numerals in FIG. 4). In the processing in the first addition step of the present embodiment, the third and fourth edges corresponding to the first and second edges in the original image 11 are joined or connected by a straight line and the resulting triangle is superimposed on the high-resolution bit map 2. Interpolation is effected by making dots that are completely enclosed within the triangle black dots to form edges that extend in the Y direction. By doing so, specified edges in the original bit map 1 can be joined by straight lines and the resulting triangles can be reproduced on the high-resolution bit map 2. Accordingly, it is possible to perform interpolation smoothly in a short time without using a look-up table.

For example, in FIG. 6, when scanning is performed for the lines Y0, Y1, and Y2 in the X direction, the edge E3 is detected as the first edge and the edge E4 is detected as the second edge. The edge E3 and the edge E4 are connected by a straight line L3 and dots that do not reach or cross over the straight line L3 are converted into black dots, so that the edges E27, E28, and E29 that extend in the Y direction are formed as shown in FIG. 4. In the present embodiment, the dots that partially extend beyond the triangle formed by the straight line L3 are not converted into black dots, so that the added edges do not extend in the Y direction beyond the straight line L3. The smoothing by the present embodiment makes the outline smooth by adding black dots, so that the proportion of black dots in a smoothed image 21 produced for the original image 11 is increased. Accordingly, by minimizing the number of black dots added for smoothing purposes, large changes to the relative proportions of black and white can be prevented.

Once the second edge has been detected and the interpolation between the corresponding third and fourth edges has been completed, in step 62, information of the first edge and the second edge is cleared, and until the end of the line, that is, until the end in the X direction is reached, the processing returns to step 53 and the processes described above for detecting edges and adding dots between the edges are repeated. In step 63, it is confirmed whether scanning has been performed up to the end of the line. When the end of the line has been reached, in step 64, the edge discovery information is cleared and in step 65 it is confirmed whether every line has been scanned. When unscanned lines remain, in step 66 the lines are moved over by one line, so that for example the lines Y1, Y2, and Y3 are set. The processing returns to step 53, these three lines are newly scanned in the X direction, and a new search for edges and a smoothing process that adds dots between edges are performed.

In addition, in step 65 it is determined whether the smoothing process performed while scanning in the X direction has been completed as far as the end of the original bit map 1. When the scanning all lines arranged in the Y direction has been completed for every line, in step 67 it is confirmed whether scanning has been performed in both directions. When one direction is left, in step 68 the scanning direction is changed to the Y direction, three lines are set at a time in the X direction, edges are detected while scanning in the Y direction in the same way as described above, and a smoothing process that adds dots between the detected edges is performed. That is, processing of a second detection step and a second addition step is performed for a different direction.

The step 53 becomes a second detection step and three lines adjacent in the X direction, i.e., the second direction, are scanned at a time in the Y direction. In step 55, a fifth edge is detected and in step 60 a sixth edge is detected. As a result, in step 61, in the second bit map 2 with high resolution, edges that extend in the X direction are added between seventh and eighth edges that correspond to the fifth and sixth edges so as to effect interpolation between these seventh and eighth edges. At this point also, the seventh and eighth edges that correspond to the fifth and sixth edges of the original image 11 are joined by a straight line and only dots that are completely enclosed within the resulting triangle are converted into black dots to effect interpolation and thereby form edges that extend in the X direction. By doing so, in the Y direction, a smooth interpolated image in which specified edges in the original bit map 1 are connected by straight lines can also be obtained. When scanning and smoothing have been completed in both directions in step 67, the smoothed high-resolution bit map 2 that has increased resolution in the X direction and the Y direction is completed.

It is possible to provide a program or program product having instructions that can cause a general-purpose processor execute the above process and, by installing such program into a processor, to provide an apparatus that can execute the method of generating a bit map according to the present invention. Each or some of the above processes can be realized by hardware, and an ASIC or an LSI equipped with such dedicated circuits can be provided as a bit map generating apparatus according to the present invention. In particular, the method of generating a bit map according to the present invention is centered on the repeated detection and addition processes, so that there is great potential for increases in processing speed by implementing such processes in dedicated circuits. It is also possible to provide a circuit board equipped with the bit map generating function of the present invention by mounting a plurality of chips equipped with appropriate circuits onto a circuit board.

Figure 8:
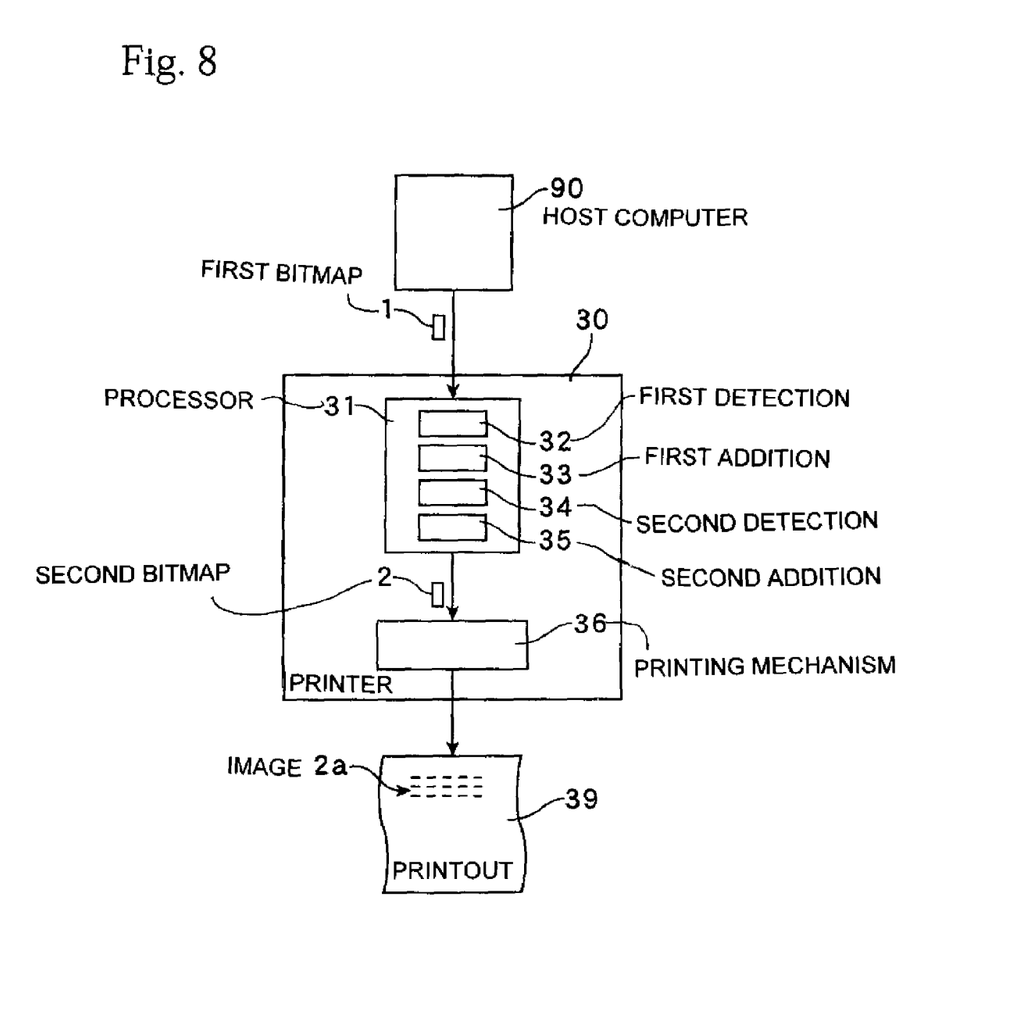
FIG. 8 is a diagram schematically showing a printer that can print according to a bit map according to the present invention.

As shown in FIG. 8, as the bit map generating apparatus, it is possible to provide an ASIC, LSI, or processor 31, or a control circuit board equipped with a first detection function 32 that detects edges while scanning in the X direction, a first addition function 33 that adds dots to effect interpolation between the third and fourth edges corresponding to the first and second edges detected in the X direction, a second detection function 34 that detects edges while scanning in the Y direction, and a second addition function 35 that adds dots to effect interpolation between the seventh and eighth edges corresponding to the fifth and sixth edges detected in the Y direction. Details of the above functions are in accordance with the processes shown in FIG. 5. A printer 30 equipped with the processor 31 and a printing mechanism 36 that prints data, that is, a bit map processed by the processor 31 can be provided. In the printer 30, it is possible to provide to the printing mechanism 36 the high-resolution bit map (the second bit map) 2 for printing using the low-resolution original bit map (the first bit map) 1 supplied from a host computer 90. Accordingly, a print out 39, on which an image 2a with smoothly connected outlines that are not wavy has been printed at high resolution based on the second bit map 2, can be obtained from the printer 30.

The processor 31 that can execute the processing shown in FIG. 5 may be equipped with hardware logic, such as dedicated circuits, that implements the functions 32 and 34 for detecting edges and the functions 33 and 35 for adding dots as described above. Alternatively, the processor 31 may be equipped with a recording medium, such as a ROM or a RAM, in which a program including instructions that can execute the process that detects the edges and the process that effects interpolation by adding dots between edges shown in FIG. 5 is stored.

In addition, the processing shown in FIG. 5 can be implemented by supplying a program, such as a printer driver program, that can be executed by a general-purpose information processing terminal such as a personal computer and acts as a host apparatus for a printer to function as the bit map generating apparatus. On the host computer 90 shown in FIG. 9, an application 91 that outputs the low-resolution original bit map (the first bit map) 1, such as a word processor or a WWW browser, and a printer driver program (printer driver) 95 that converts the first bit map 1 into the high-resolution bit map (the second bit map) 2 and supplies the high-resolution bit map 2 to the printer 30 are installed. This printer driver 95 includes instructions that make it possible for the host computer 90 to execute a first detection step 96 that detects edges while scanning in the X direction, a first addition step 97 that adds dots to effect interpolation between the third and fourth edges corresponding to the first and second edges detected in the X direction, a second detection step 98 that detects edges while scanning in the Y direction, and a second addition step 99 that adds dots to effect interpolation between the seventh and eighth edges corresponding to the fifth and sixth edges detected in the Y direction, in accordance with the processes shown in FIG. 5.

Figure 9:
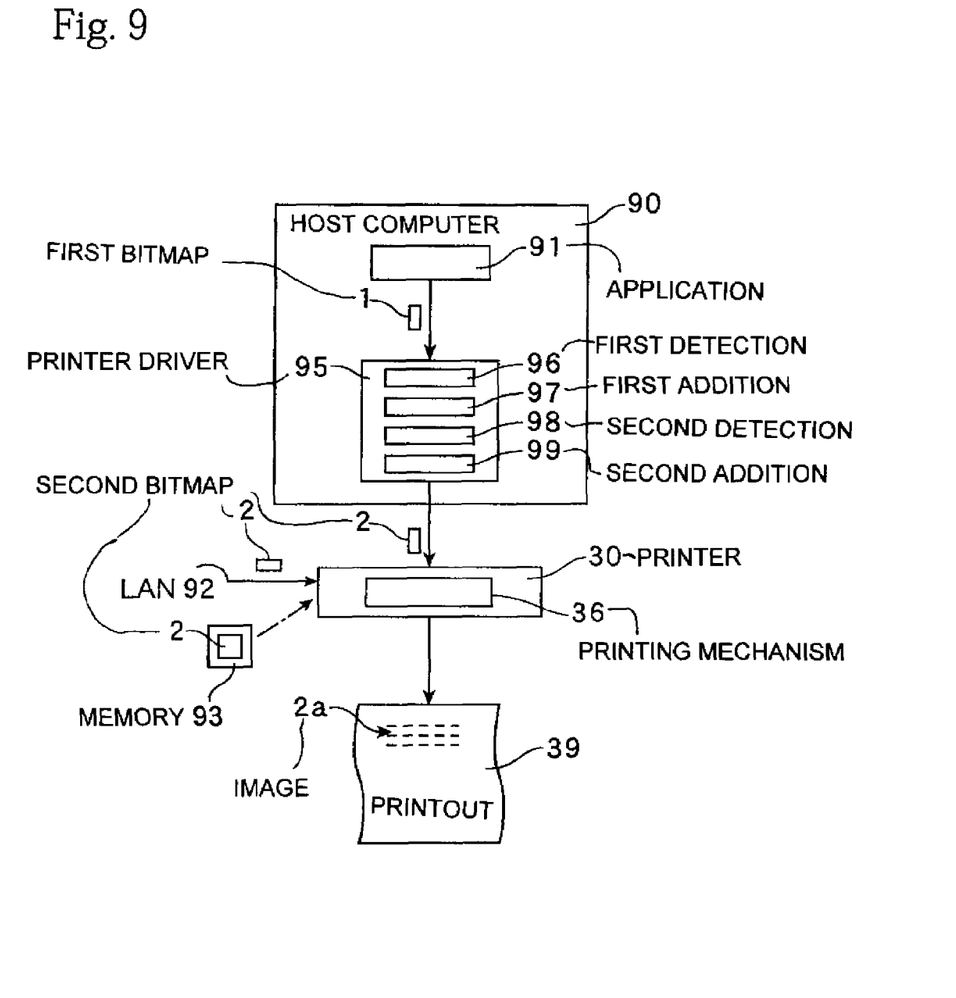
FIG. 9 is a diagram schematically showing a host computer and system that can output a bit map according to the present invention.

Accordingly, in a print system shown in FIG. 9 composed of the host computer 90 and the printer 30, the low-resolution first bit map 1 supplied from the application 91 is converted via the printer driver 95 into the high-resolution bit map 2 which is supplied to the printer 30. This means that it is possible to obtain, from the printer 30, a print out 39 on which the image 2a with smoothly connected outlines that are not wavy has been printed at high resolution based on the second bit map 2. The second bit map 2 can be supplied via a computer network, such as a LAN 92, and can also be supplied by recording the second bit map 2 in an appropriate memory 93.

An example where a bit map is prepared with increased resolution in both the X direction and the Y direction is described above, it is also possible to prepare or generate a bit map with increased resolution in only one direction in the same way. In this case, if the resolution in the Y direction is increased, smoothing can be performed by scanning in the X direction only, with it not being necessary to scan in the Y direction. Also, the present invention is not limited to cases where the resolution is raised by the same factor in the X direction and the Y direction and can also be applied in cases where different resolutions are used in the X direction and the Y direction.

Further, although a printer, which is equipped with a printing mechanism that prints an image based on the second bit map as an output mechanism for outputting the second bit map as an image, has been described above as an image output apparatus, the second bit map is also a pixel matrix or pixel pattern, and the present invention is not limited to a printer and can be applied to other printing apparatuses, displays, and the like so long as such appliance outputs an image. In addition, although the present invention has been described using an example of monochromatic bit maps to simplify the explanation, it is possible to apply the present invention to bit maps for color images. In the case of RGB (red, green, and blue), YMC (yellow, magenta, and cyan), or YMCK (yellow, magenta, cyan, and black) color image bit maps, dots of a color being subjected to smoothing correspond to the dots that are "on" in the above description, while dots of the other colors or white dots correspond to the dots that are "off".

According to the method of generating a bit map of the present invention, when a bit map for printing or displaying an image is converted into a bit map with higher resolution, smoothing is performed by adding edges to effect interpolation between edges in the original bit map, thereby improving image quality. This means that smoothing can be performed without using predetermined bit maps, a look-up table, or the like, and prevent waste time for generating a look-up table. Since the time required to refer to a look-up table can also be eliminated, it becomes possible to perform smoothing in a shorter time.

In this invention, if edges that appear in one after another in a given direction can be detected regardless of distance, smoothing can be performed between such edges, and long-cycle or long-range unevenness can also be subjected to smoothing. Accordingly, the problem of outlines becoming wavy due to the resolution being increased can be eliminated. Smoothing can also be performed regardless of the factor of magnification. According to the present invention, it becomes possible to produce a high-resolution bit map, which makes it possible to output an image with clearer, sharper outlines, in a short time.

INDUSTRIAL APPLICABILITY

A method of generating a bit map and a bit map generating apparatus according to the present invention can prepare a smoothed bit map with an increased resolution in a short time, and can provide a printer or other image output apparatus capable of outputting sharp images with high resolution in a short time, and also an apparatus for supplying data to such printer or other image output apparatus.

The invention claimed is:

1. A method of generating a bit map, comprising:
  detecting, when a second bit map, improved in first-direction resolution, is generated from a first bit map in which a plurality of image-forming pixels are arranged two-dimensionally, a first edge and a second edge appearing in a second direction orthogonal to a first direction in the first bit map; and
  adding, between a third edge and a fourth edge in the second bit map that respectively correspond to the first edge and the second edge, at least an edge extending in the first direction so as to effect interpolation between the third edge and the fourth edge,
  wherein the detecting the first and the second edges includes scanning three lines of pixels adjacent in the first direction, the scanning being in the second direction, the scanning in the second direction including:
  setting a center line of the three lines adjacent in the first direction as an edge detection line;
  setting, in a case where an adjacent pixel in the edge detection line changes from "off" to "on", a position after a change in combinations of three pixels adjacent in the first direction in the scanning three lines from "off-off-off" to "off-off-on" or "on-off off" as the position of the first edge, and a subsequent position after a change in combinations of the three pixels adjacent in the first direction from "off-off-on" to "off-on-on" or from "on-on-off" to "on-off-off" as the position of the second edge;
  setting, in a case where an adjacent pixel in the edge detection line changes from "on" to "off", a position prior to a change in combinations of the three pixels adjacent in the first direction from "on-on-off" to "on-off-off" or from "off-on-on" to "off-off-on" as the position of the first edge, and a subsequent position prior to a change in combinations of the three pixels adjacent in the first direction from "on-off-off" or "off-off-on" to "off-off-off" as the position of the second edge; and
  treating as valid the positions of the first and the second edges when a pattern that is neither a pattern after a change corresponding to the first edge nor a pattern corresponding to the second edge is not detected between the positions of the first and the second edges.

2. The method according to claim 1,
wherein the adding at least an edge between the third edge and the fourth edge addes the edge within a range in which the edge and a straight line connecting the third edge and the fourth edge are not crossed.

3. The method according to claim 1,
wherein when the second bit map is also improved in second-direction resolution, the method further comprises:
detecting a fifth edge and a sixth edge appearing in the first direction in the first bit map; and
adding, between a seventh edge and an eighth edge in the second bit map that respectively correspond to the fifth edge and the sixth edge, at least an edge that extends in the second direction so as to effect interpolation between the seventh edge and the eighth edge,
wherein the detecting the fifth and the sixth edges includes scanning three lines of pixels adjacent in the second direction, the scanning being in the first direction, the scanning in the first direction including:
setting a center line of the three lines adjacent in the second direction as an edge detection line;
setting, in a case where an adjacent pixel in the edge detection line changes from "off" to "on", a position after a change in combinations of three pixels adjacent in the second direction in the scanning three lines from "off-off-off" to "off-off-on" or "on-off-off" as the position of the fifth edge, and a subsequent position after a change in combinations of the three pixels adjacent in the second direction from "off-off-on" to "off-on-on" or from "on-off-off" to "on-on-off" as the position of the sixth edge;
setting, in a case where an adjacent pixel in the edge detection line changes from "on" to "off", a position prior to a change in combinations of the three pixels in the second direction from "on-on-off" to "on-off-off" or from "off-on-on" to "off-off-on" as the position of the fifth edge, and a subsequent position prior to a change in combinations of the tree pixels adjacent in the second direction from "on-off-off" or "off-off-on" to "off-off-off" as the position of the sixth edge; and
treating as valid the positions of the fifth and the sixth edges when a pattern that is neither a pattern after a change corresponding to the fifth edge nor a pattern corresponding to the sixth edge is not detected between the fifth edge and the sixth edge.

4. The method according to claim 3,
wherein the adding at least an edge between the seventh edge and the eighth edge adds the edge within a range in which the edge and a straight line connecting the seventh edge and the eighth edge are not crossed.

5. A program product for generating a second bit map, improved in first-direction resolution, from a first bit map in which a plurality of image-forming pixels are arranged two-dimensionally, the program product comprising:
a computer-readable medium; and
instructions stored on said computer-readable medium for executing:
detecting a first edge and a second edge appearing in a second direction orthogonal to a first direction in the first bit map; and
adding, between a third edge and a fourth edge in the second bit map that respectively correspond to the first edge and the second edge, at least an edge extending in the first direction so as to effect interpolation between the third edge and the fourth edge,
wherein the detecting the first and the second edges includes scanning three lines of pixels adjacent in the first direction, the scanning being in the second direction, the scanning in the second direction including:
setting a center line of the three lines adjacent in the first direction as an edge detection line;
setting, in a case where an adjacent pixel in the edge detection line changes from "off" to "on", a position after a change in combinations of three pixels adjacent in the first direction in the scanning three lines from "off-off-off" to "off-off-on" or "on-off off" as the position of the first edge, and a subsequent position after a change in combinations of the three pixels adjacent in the first direction from "off-off-on" to "off-on-on" or from "on-on-off" to "on-off-off" as the position of the second edge;
setting, in a case where an adjacent pixel in the edge detection line changes from "on" to "off", a position prior to a change in combinations of the three pixels adjacent in the first direction from "on-on-off" to "on-off-off" or from "off-on-on" to "off-off-on" as the position of the first edge, and a subsequent position prior to a change in combinations of the three pixels adjacent in the first direction from "on-off-off" or "off-off-on" to "off-off-off" as the position of the second edge; and
treating as valid the positions of the first and the second edges when a pattern that is neither a pattern after a change corresponding to the first edge nor a pattern corresponding to the second edge is not detected between the positions of the first and the second edges.

6. The program product according to claim 5,
wherein the adding at least an edge between the third edge and the fourth edge adds the edge within a range in which the edge and a straight line connecting the third edge and the fourth edge are not crossed.

7. The program product according to claim 5,
wherein, when the second bit map is also improved in second-direction resolution, the program product further comprises instructions for executing:
detecting a fifth edge and a sixth edge appearing in the first direction in the first bit map; and
adding, between a seventh edge and an eighth edge in the second bit map that respectively correspond to the fifth edge and the sixth edge, at least an edge that extends in the second direction so as to effect interpolation between the seventh edge and the eighth edge,
wherein the detecting the fifth and the sixth edges includes scanning three lines of pixels adjacent in the second direction, the scanning being in the first direction, the scanning in the first direction including:
setting a center line of the three lines adjacent in the second direction as an edge detection line;
setting, in a case where an adjacent pixel in the edge detection line changes from "off" to "on", a position after a change in combinations of three pixels adjacent in the second direction in the scanning three lines from "off-off-off" to "off-off-on" or "on-off-off" as the position of the fifth edge, and a subsequent position after a change in combinations of the three pixels adjacent in the second direction from "off-off-on" to "off-on-on" or from "on-off-off" to "on-on-off" as the position of the sixth edge;
setting, in a case where an adjacent pixel in the edge detection line changes from "on" to "off", a position prior to a change in combinations of the three pixels in the second direction from "on-on-off" to "on-off-off" or from "off-on-on" to "off-off-on" as the position of the fifth edge, and a subsequent position prior to a change in combinations of the tree pixels adjacent in the second direction from "on-off-off" or "off-off-on" to "off-off-off" as the position of the sixth edge; and
treating as valid the positions of the fifth and the sixth edges when a pattern that is neither a pattern after a change corresponding to the fifth edge nor a pattern corresponding to the sixth edge is not detected between the fifth edge and the sixth edge.

8. The program product according to claim 7,
wherein the adding at least an edge between the seventh edge and the eighth edge addes the edge within a range in which the edge and a straight line connecting the seventh edge and the eighth edge are not crossed.

9. An apparatus for generating a second bit map, improved in first-direction resolution, from a first bit map in which a plurality of image-forming pixels are arranged two-dimensionally, the apparatus comprising:
first functional unit for detecting a first edge and a second edge appearing in a second direction orthogonal to a first direction in the first bit map; and
first functional unit for adding, between a third edge and a fourth edge in the second bit map that respectively correspond to the first edge and the second edge, at least an edge extending in the first direction so as to effect interpolation between the third edge and the fourth edge,
wherein the first functional unit for detecting includes function of scanning three lines of pixels adjacent in the first direction, the function of scanning being scanning in the second direction, the function of scanning in the second direction including functions of:
setting a center line of the three lines adjacent in the first direction as an edge detection line;
setting, in a case where an adjacent pixel in the edge detection line changes from "off" to "on", a position after a change in combinations of three pixels adjacent in the first direction in the scanning, three lines from "off-off-off" to "off-off-on" or "on-off-off" as the position of the first edge, and a subsequent position after a change in combinations of the three pixels adjacent in the first direction from "off-off-on" to "off-on-on" or from "on-on-off" to "on-off-off" as the position of the second edge;
setting, in a case where an adjacent pixel in the edge detection line changes from "on" to "off", a position prior to a change in combinations of the three pixels adjacent in the first direction from "on-on-off" to "on-off-off" or from "off-on-on" to "off-off-on" as the position of the first edge, and a subsequent position prior to a change in combinations of the three pixels adjacent in the first direction from "on-off-off" or "off-off-on" to "off-off-off" as the position of the second edge; and treating as valid the positions of the first and the second edges when a pattern that is neither a pattern after a change corresponding to the first edge nor a pattern corresponding to the second edge is not detected between the positions of the first and the second edges.

10. The apparatus according to claim 9,
wherein the first functional unit for adding at least an edge adds the edge within a range in which the edge and a straight line connecting the third edge and the fourth edge are not crossed.

11. The apparatus according to claim 9,
wherein the second bit map is also improved in second-direction resolution, and the apparatus further comprises:

second functional unit for detecting a fifth edge and a sixth edge appearing in the first direction in the first bit map; and second functional unit for adding, between a seventh edge and an eighth edge in the second bit map that respectively correspond to the fifth edge and the sixth edge, at least an edge that extends in the second direction so as to effect interpolation between the seventh edge and the eighth edge, wherein the second functional unit for detecting includes a function of scanning three lines of pixels adjacent in the second direction, the function of scanning being scanning in the first direction, the function of scanning in the first direction including functions of:

setting a center line of the three lines adjacent in the second direction as an edge detection line;

setting, in a case where an adjacent pixel in the edge detection line changes from "off" to "on", a position after a change in combinations of three pixels adjacent in the second direction in the scanning three lines from "off-off-off" to "off-off-on" or "on-off-off" as the position of the fifth edge, and a subsequent position after a change in combinations of the three pixels adjacent in the second direction from "off-off-on" to "off-on-on" or from "on-off-off" to "on-on-off" as the position of the sixth edge;

setting, in a case where an adjacent pixel in the edge detection line changes from "on" to "off", a position prior to a change in combinations of the three pixels in the second direction from "on-on-off" to "on-off-off" or from "off-on-on" to "off-off-on" as the position of the fifth edge, and a subsequent position prior to a change in combinations of the tree pixels adjacent in the second direction from "on-off-off" or "off-off-on" to "off-off-off" as the position of the sixth edge; and treating as valid the positions of the fifth and the sixth edges when a pattern that is neither a pattern after a change corresponding to the fifth edge nor a pattern corresponding to the sixth edge is not detected between the fifth edge and the sixth edge.

12. The apparatus according to claim 11,
wherein the second functional unit for adding adds the edge within a range in which the edge and a straight line connecting the seventh edge and the eighth edge are not crossed.

13. An image outputting apparatus comprising a apparatus for generating a second bit map according to claim 9 and an output mechanism that outputs the second bit map.

14. The image outputting apparatus according to claim 13, wherein the output mechanism is a printing mechanism that prints an image according to the second bit map.

* * * * *